United States Patent [19]
Layne et al.

[11] 3,844,771
[45] Oct. 29, 1974

[54] METHOD FOR CONDENSING METAL VAPOR MIXTURES

[75] Inventors: Gilbert S. Layne; Leigh B. Bangs; James O. Huml, all of Midland, Mich.

[73] Assignee: The Dow Chemical Company, Midland, Mich.

[22] Filed: Jan. 6, 1970

[21] Appl. No.: 909

[52] U.S. Cl. ............................................. 75/68 B
[51] Int. Cl. ............................................. C22b 21/00
[58] Field of Search ........................... 75/68 R, 68 B

[56] References Cited
UNITED STATES PATENTS

| | | | |
|---|---|---|---|
| 2,184,705 | 12/1939 | Willmore | 75/68 R |
| 2,295,226 | 9/1942 | Long | 75/67 |
| 2,391,727 | 12/1945 | McConica | 75/67 |
| 2,470,306 | 5/1949 | Gross | 75/63 X |
| 2,914,398 | 11/1959 | Johnston et al. | 75/68 B |
| 3,078,159 | 2/1963 | Hollingshead et al. | 75/68 B |
| 3,234,013 | 2/1966 | Phillips et al. | 75/68 B |
| 3,235,376 | 2/1966 | Hollingshead | 75/68 R |
| 3,311,363 | 3/1967 | Phillips et al. | 75/68 B |
| 3,336,731 | 8/1967 | Phillips et al. | 75/68 BU X |
| 3,397,056 | 8/1968 | Layne et al. | 75/68 |
| 3,436,211 | 4/1969 | Dewing | 75/68 R |

*Primary Examiner*—L. Dewayne Rutledge
*Assistant Examiner*—M. J. Andrews
*Attorney, Agent, or Firm*—Bruce M. Kanuch

[57] ABSTRACT

Methods are provided for condensing an aluminum halide and an alkali, or alkaline earth, metal vapor mixture by intimate mixing with a relatively cooler, liquid condensation product of such vapors. Suitable intimate mixing is achieved as by spraying the liquid condensate into the vapor or by liquid-vapor mixing in a packed column.

15 Claims, 2 Drawing Figures

PATENTED OCT 29 1974

3,844,771

INVENTORS.
Gilbert S. Layne
Leigh B. Bangs
James O. Huml
BY William R. Harris
ATTORNEY

METHOD FOR CONDENSING METAL VAPOR MIXTURES

It is known that aluminum can be separated from its impure alloys by heating a mixture of the alloy with the halide of an alkali or alkaline earth metal at a temperature sufficient to cause transport of the aluminum values in the vapor state, i.e., distillation. See for example, Willmore, U.S. Pat. No. 2,184,705 and Gross, U.S. Pat. No. 2,470,305.

Recovery of the aluminum values is effected by condensing the vapors to recover a purified aluminum and a regenerated metal halide. In the mode of operation taught by Layne and Huml, U.S. Pat. No. 3,397,056, distillation is accomplished in the presence of magnesium fluoride and a condensate of two immiscible liquid phases of aluminum and the metal halide is recovered. By maintaining the condensate in a molten form for a sufficient period of time, the immiscible phases coalesce to achieve a continuous and efficient separation. The reaction can be described as: $2AlF(g) + Mg(g) \rightarrow 2Al(l) + MgF_2(l)$.

It is an object of the instant invention to provide a new technique for condensing halometalliferous vapor systems, particularly those comprising an aluminum halide and the vapor of a volatile alkali, or alkaline earth, metal, which vapors condense to produce liquid aluminum and a halide of the volatile metal.

A still further object is to provide an improved method for condensing a mixture of aluminum fluoride and magnesium vapors to produce aluminum and recover magnesium fluoride.

Still another object is to provide a condensation method utilizing a portion of the condensate as the condensing medium.

Further objects are to provide techniques of cooling the condensate and recycling a portion thereof to the condensation zone for intimate mixing with the halometalliferous vapors.

The above objects, and other benefits as will become apparent hereinafter, are achieved in a process which comprises intimately mixing, in a condensation zone, a mixture of AlX + M vapors with a portion of the liquid condensate of such vapors, which has been suitably cooled to provide a heat exchanging condensing medium. X is fluorine or chlorine and M is an alkali metal or alkaline earth metal. The condensate used as the condensing medium is cooled to a temperature lower than the condensation temperature of the vapors but above the liquidus temperature of the condensate.

In a preferred embodiment, the condensate is coalesced before cooling for recycle to provide two immiscible liquid layers of aluminum and fused salt, i.e., the halide of the volatile metal ($MX_a$ wherein $a$ is the normal valence of M). The order of the two layers is dependent upon their densities. Normally, the alkaline earth metals, such as magnesium, produce salt phases which are more dense than liquid aluminum and thus constitute the lower liquid phase in the collection zone of the condenser. Alkali metal salts, on the other hand, are less dense than aluminum and, depending upon their preponderance in the fused salt, the salt layer may be the upper most.

The portion of the condensate recycled as the condensing medium may be liquid aluminum, the fused salt, or a mixture thereof, which has been suitably cooled below the condensation temperature of the incoming vapors. Cooling of the condensate to be recycled to the condensation zone is accomplished in any convenient manner such as, for example, by contacting it with steam cooled heat exchange coils.

Preferably, the necessary cooling is achieved by contacting the liquid body of molten aluminum with a fused salt bath which can be cooled to relatively low temperatures without solidification. The desirable salt bath is also less dense than liquid aluminum and provides a protective seal against the atmosphere. Suitable salts include, for example, the alkali metal chlorides and mixtures thereof, such as sodium and potassium chlorides.

Other means of cooling the condensing medium include passing it through a series of pipes which radiate heat to their surroundings. Such radiation can be accelerated by providing adjacent cold bodies to absorb the heat.

In the accompanying drawings.

Figure 1:
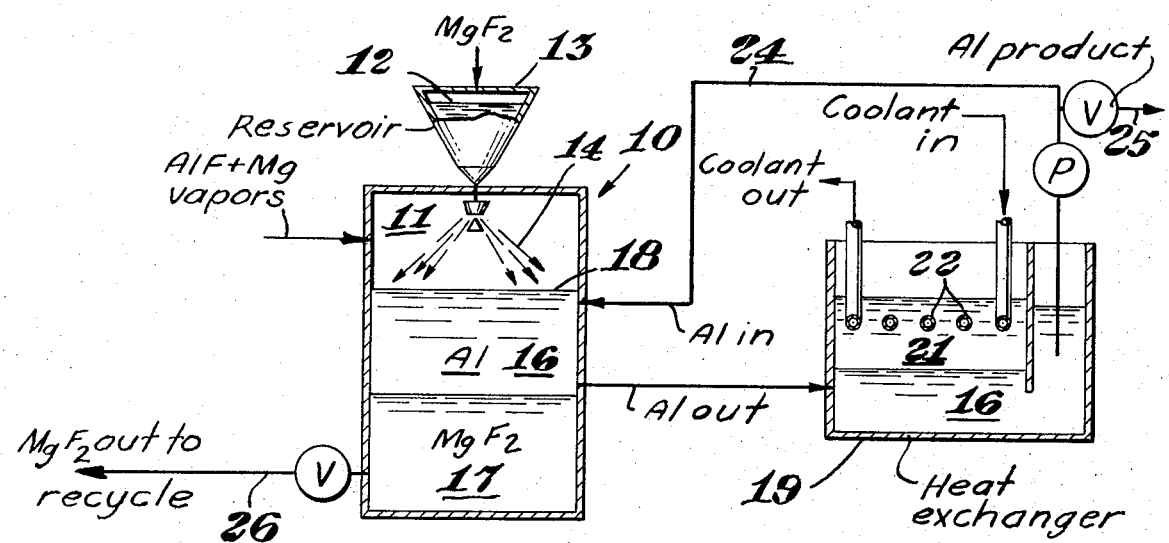
FIG. 1 is a schematic illustration of a method for cooling aluminum fluoride and magnesium vapors with a spray of recycled magnesium fluoride to recover aluminum and magnesium fluoride liquids.

With reference to FIG. 1, aluminum fluoride and magnesium vapors are shown entering a condensation zone 11 of a vapor condenser 10 in which they are contacted with a gravity fed spray 14 of magnesium fluoride 12. The fluoride 12 is supplied under gravity from a spray reservoir 13. On contacting the cooler liquid magnesium fluoride 12, the vapors are condensed to recover liquid aluminum and magnesium fluoride, as two distinct and essentially immiscible liquid phases 16 and 17, respectively, at the bottom of the condensation zone 11. The body of liquid aluminum 16 is cooled in a separate heat exchanger 19 operated in direct liquid communication with and, at a liquid level relating to the aluminum level in the condenser 10 to avoid any need for pumps or valves in the transfer from the condenser 10 to the heat exchanger 19. Within the heat exchanger 19, the liquid aluminum 16 is cooled with a floating, fused salt bath 21. This bath is cooled in turn, by means of a steam coil 22, to a temperature above the melting point of aluminum. The cooled aluminum is then pumped from a well through return line 24 and returned to the liquid body of aluminum 16 in the condenser 10, wherein it provides both a condensing surface 18 for incoming vapors and a cooling, liquid body in contact with the magnesium fluoride 17. The latter is cooled thereby to a temperature above its solidus temperature (~1,256°C.). The magnesium fluoride is withdrawn from the condenser for transfer to the spray reservoir 13 or for recycle to a distillation reaction system, as described in U.S. Pat. No. 3,397,056. Aluminum product is continuously, or periodically, withdrawn from the condensing system at product line 25.

Figure 2:
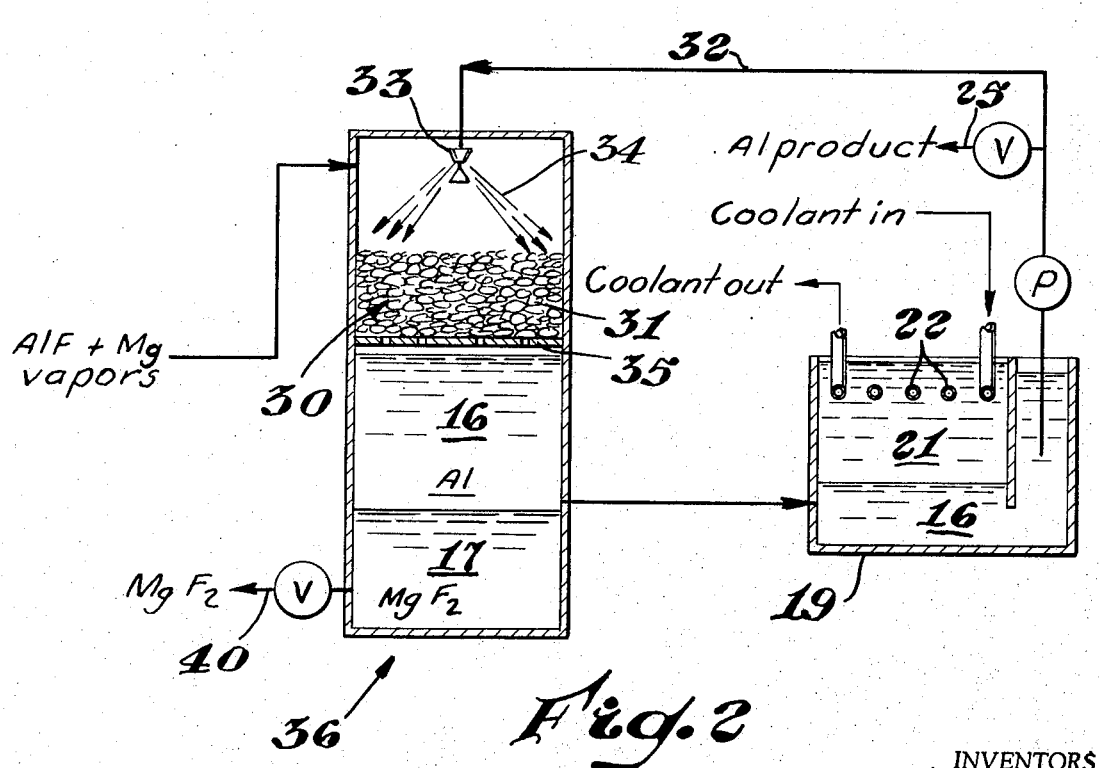
FIG. 2 depicts a condensation method utilizing liquid aluminum as a direct cooling recycle stream for contacting metalliferous vapors in a packed column.

The process depicted in FIG. 2 condenses aluminum fluoride and magnesium vapors within a packed bed 30 of inert solid shapes 31 supported upon a perforated structural support 35. This support 35 allows condensate to drain into the lower portion of the condenser 36, wherein distinct liquid phases of liquid aluminum 16 and magnesium fluoride 17 are coalesced. Condensation is achieved by recycling cooled liquid aluminum 16 through line 32 from the heat exchanger 19 directly to a spray distribution head 33, which mixes the incoming vapors with liquid aluminum spray 34. The result is cocurrent condensation downwardly through the packed bed 30. Coalesced magnesium fluoride 17 is withdrawn at product line 40 for recycle to a distillation furnace, not illustrated, and liquid aluminum product is recovered from the system at product line 25. The heat exchanger 19 is identical in design and operation to that described in FIG. 1 and like reference numbers refer to the same components in both Figures.

In a particular operation, the condensing process such as that depicted in FIG. 2, is operated in an essentially continuous manner. The liquid aluminum 16 is cooled in the heat exchanger 19 and returned to the condensation zone at a temperature of approximately 800°C. The particular temperature chosen for the aluminum condensing medium is unimportant, provided that it is lower than the temperature of the incoming metalliferous vapors and above the melting point of aluminum. Further, the quantity of recycled aluminum 16 should be sufficient to essentially absorb the heat flux equivalent to the change in sensible heat of the incoming vapors relative to their condensates of aluminum and magnesium fluoride. Upon condensation, liquid aluminum and an alkaline earth metal fluoride are regenerated and collected as distinct immiscible phases 16 and 17 at the bottom of the condenser.

The fluoride has a melting point substantially higher than liquid aluminum. It is therefore preferred practice to remove heat from the system by cooling the liquid aluminum, since much more heat can be removed without introducing a solid phase. Accordingly, when using magnesium fluoride as the condensing medium, as shown in FIG. 1, cooled liquid aluminum is returned to the body of liquid aluminum contained in the lower region of the condenser 10. This in turn cools the magnesium fluoride 17 sufficiently for use as a condensing medium. A portion of the cooled magnesium fluoride 17 is then recycled to the spray reservoir 13 for application as a cooling spray 14 into the incoming vapors.

Molten aluminum is withdrawn from the condenser at a temperature within the range of about 1,100°-1,300°C. and passed into the heat exchanger. Heat is removed from the aluminum by conduction through a floating, fused salt bath, e.g., a 50/50 mole per cent melt of NaCl and KCl, which in turn is cooled, as by steam coils immersed in the fused salt. The liquid aluminum may be cooled to a temperature as low as its solidus temperature, but is preferably reduced to a temperature in the range of 700° to 900°C.

Intimate mixing between a condensing medium and the incoming vapors is efficiently accomplished by sprays and contacting in packed beds. Such beds may be operated cocurrently or countercurrently, i.e., the vapors can be introduced into such beds so as to flow downwardly or upwardly. Media for such beds must be inert to the liquid condensation products. Suitable materials of construction include for example graphite, zirconium boride and titanium boride.

In most operations, it is expected that the amount of volatile metal vapor in the incoming vapors may be less or more than the stoichiometrically reactive equivalent of the aluminun halide. When less than a stoichiometric amount is utilized, the aluminum halide will condense to produce higher halides of aluminum and pure aluminum metal. Such higher aluminum halides will be incorporated in any metal halide formed to produce a mixed fused salt bath. To avoid the possibility of interfering solidification in the system, it is preferred practice to operate with an AlX/M ratio within the range of about 0.2 to 20. Preferably, when AlX is aluminum fluoride and M is an alkaline earth metal such as Mg, this ratio is maintained within a range from about 1.75 to about 2.5. Control of this ratio is achieved by periodically bleeding off the salt phase to reduce accumulations of aluminum halides in the system.

What is claimed is:
1. A process which comprises
   1. intimately mixing in a condensation zone a mixture comprising AlX + M vapors, wherein X is fluorine or chlorine and M is an alkali metal or alkaline earth metal, with a liquid condensing medium, consisting of a condensation product of such vapor, at a temperature lower than the condensation temperature of the vapors to produce a liquid condensate comprising a liquid aluminum phase and a liquid $MX_a$ phase, wherein a is the normal valence of M, said condensate being at a temperature $T_1$,
   2. coalescing the liquid aluminum and $MX_a$ phases to provide separate liquid layers of each,
   3. cooling a portion of the coalesced liquid condensate produced in Step 2 above to a temperature of $T_2$
   4. returning the cooled condensate to the condensation zone as the condensation medium in Step 1 above, said temperature $T_2$ being above the solidus temperature of the cooled condensate and at least about 50°C. below $T_1$.

2. A process as in claim 1 wherein the molar ratio of AlX/M in the incoming vapors is within the range of 0.2 to 20.

3. The method as in claim 1 wherein the intimate mixing is accomplished by spraying the relatively cooler condensation product into the incoming vapor mixture.

4. A method as in claim 1 wherein the portion of the liquid condensate cooled is from the coalesced liquid aluminum, which portion is removed from the liquid body of aluminum and cooled, and then recycling the cooled aluminum to the condensation zone as the liquid condensation medium in the form of a spray.

5. A process as in claim 1 wherein intimate mixing is achieved by contacting the AlX + M vapors with the relatively cooler condensation medium in a packed bed.

6. A method as in claim 1 wherein the portion of the coalesced liquid condensate cooled for recycle is liquid aluminum.

7. A method as in claim 6 wherein the liquid aluminum is cooled by a liquid-liquid contact with a molten salt bath.

8. A process which comprises
   1. intimately mixing in a condensation zone a mixture comprising AlF and Mg vapors with a condensing medium of relatively cooler liquid aluminum to produce a liquid condensate comprising a liquid aluminum phase and a $MgF_2$ phase,
   2. cooling a portion of the liquid aluminum condensate produced in Step 1 above, and
   3. returning the cooled liquid aluminum to the condensation zone as the condensing medium of Step 1 above.

9. A process as in claim 8 wherein the liquid aluminum is sprayed into the condensation zone.

10. A method as in claim 8 wherein the molar ratio of AlF/Mg is within the range of 1.75 to 2.5.

11. A process which comprises
   1. intimately mixing in a condensation zone a mixture comprising AlX + M vapors wherein X is fluorine or chlorine and M is an alkali metal or alkaline earth metal, with a condensing medium of a relatively cooler, liquid body of $MX_a$, wherein a is the normal valence of M,
   2. coalescing the liquid condensate to produce a body of liquid aluminum and a second body of liquid $Mx_a$,
   3. cooling the liquid aluminum in contact with the liquid $MX_a$ thereby reducing the temperature of the $MX_a$ and
   4. returning the cooled $MX_a$ condensate to the condensation zone as the condensing medium.

12. A method as in claim 11 wherein the incoming vapor mixture is predominately composed of aluminum monofluoride and magnesium vapor.

13. A method as in claim 11 wherein the molar ratio of AlX/M in the incoming vapors is within the range of 0.2 to 20.

14. A method as in claim 11 wherein the intimate mixing is achieved by spraying the cooled liquid $MX_a$ condensate into the condensation zone.

15. A method as in claim 11 wherein the intimate mixing of the cooled liquid MX condensate is achieved by contacting the AlX + M vapors with the relatively cooler condensation product in a packed bed.

* * * * *